July 27, 1943.    H. W. HASTWELL    2,325,509
PEA SHELLING APPARATUS
Filed April 7, 1941    3 Sheets-Sheet 1

INVENTOR
Henry W. Hastwell

July 27, 1943.   H. W. HASTWELL   2,325,509
PEA SHELLING APPARATUS
Filed April 7, 1941   3 Sheets-Sheet 2
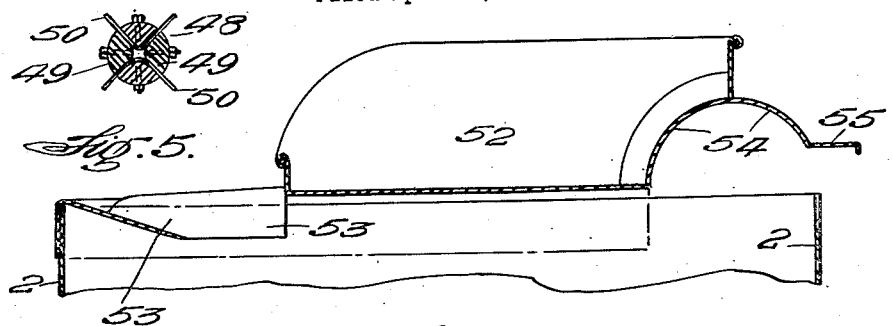
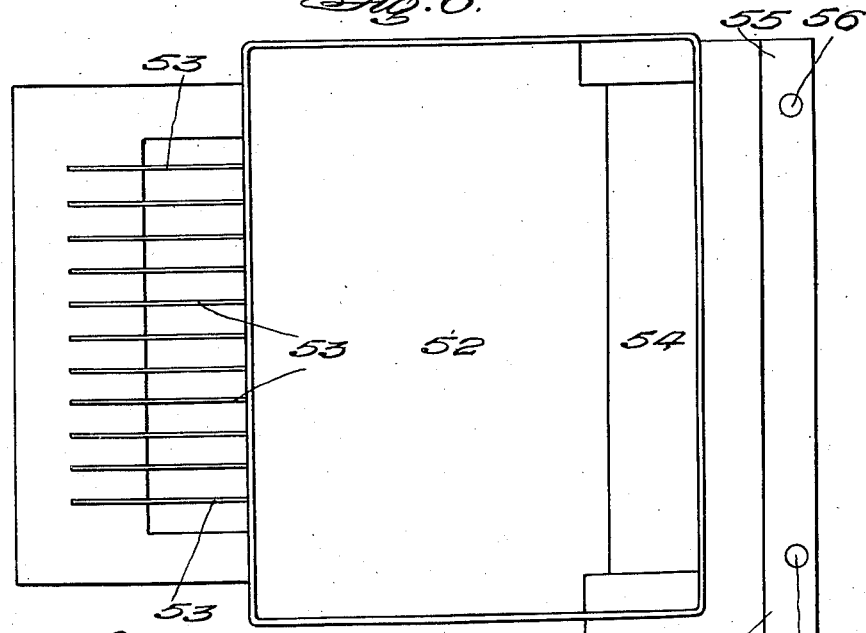
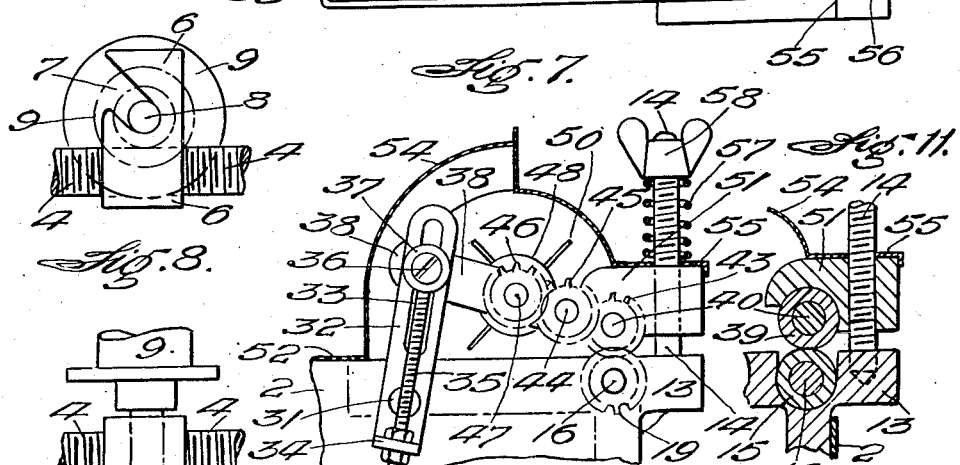
INVENTOR
Henry W. Hastwell July 27, 1943.  H. W. HASTWELL  2,325,509
PEA SHELLING APPARATUS
Filed April 7, 1941  3 Sheets-Sheet 3

Inventor:
Henry W. Hastwell

Patented July 27, 1943

2,325,509

UNITED STATES PATENT OFFICE 2,325,509

PEA SHELLING APPARATUS

Henry William Hastwell, Hobart, Tasmania, Australia

Application April 7, 1941, Serial No. 387,299
In Australia April 6, 1940

9 Claims. (Cl. 130—30)

(Granted under the provisions of sec. 14, act of March 2, 1927; 357 O. G. 5)

This invention relates to devices for de-podding or shelling peas and has for its object to provide an apparatus by which peas may be rapidly and effectively removed and separated from their pods without slow tedious individual hand feeding of the peas to the apparatus. The invention also has for its object to provide a comparatively simple apparatus the parts of which may be easily and quickly dismantled, when necessary, for cleaning and none of which are likely to become deranged or are subject to undue wear.

The invention includes a perforated feed belt leading to a pair of rollers around one of which the belt passes, with a force feed device adjoining the rollers to push the peas therebetween, the extracted peas falling through the holes in the perforated belt.

In one form the peas to be de-podded are delivered to the belt and conveyed by it to the feed device which forces them to the rollers. If desired more than one feed device may be used. When passed through the rollers the pods burst open and discharge the peas back upon the belt. In another form the feed device is located in a feed hopper into which the peas are delivered and from which they pass to the belt adjacent to the rollers. In a further form a plurality of feed devices are located in a hopper. By the use of a hopper containing a feed device the pods are wholly or partially broken open before reaching the belt. When either a single feed device or a plurality of feed devices are used, the peas, which vary, are intended to be de-podded in the hopper and discharged therefrom upon the belt. They then pass through the holes in the belt while the pods are delivered to and pass between the pair of rollers. Should any filled or partially filled pods reach the rollers from the hopper, the peas will be ejected by the squeezing action of the rollers, but primarily in the hopper form of the apparatus the belt and rollers function to separate the peas from the pods which already have been emptied in the hopper.

Referring to the drawings:

Figure 5 is a sectional detail view of a feed device.

Figure 6 is a side sectional elevation of the cover used with the apparatus seen in Figures 1, 2 and 4, showing the storage tray and the grid.

Figure 7 is a plan of the cover seen in Figure 5.

Figure 8 is an enlarged side elevation of a nut and adjusting screw by which the belt is adjusted.

Figure 9 is a plan of Figure 8.

Figure 10 is an enlarged detail view showing the drive of the rollers and feed device and also showing a means for adjusting the pressure of the rollers and feed device.

Figure 11 is an enlarged sectional view of the rollers.

Figure 1:
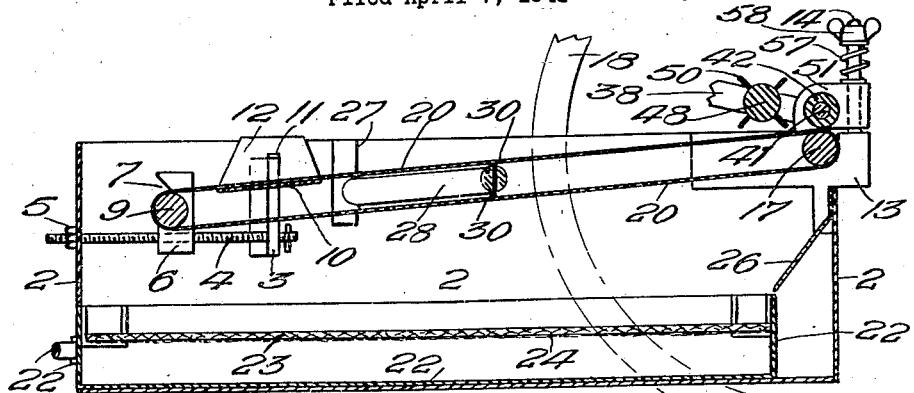
Figure 1 is a side sectional elevation of one form of the invention in which the peas are delivered to a perforated or holed belt and fed by it to a force feed device and a pair of pod squeezing rollers. A cover comprising a storage tray and a grid have been removed for convenience of illustration.
Figure 2:
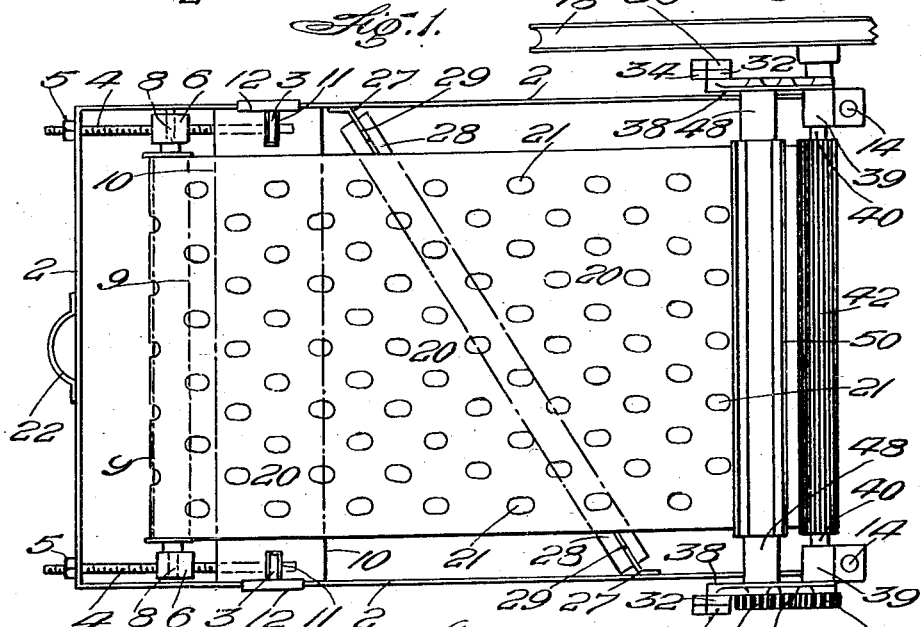
Figure 2 is a plan of the apparatus seen in Figure 1 with the cover removed.
Figures 3, 4:
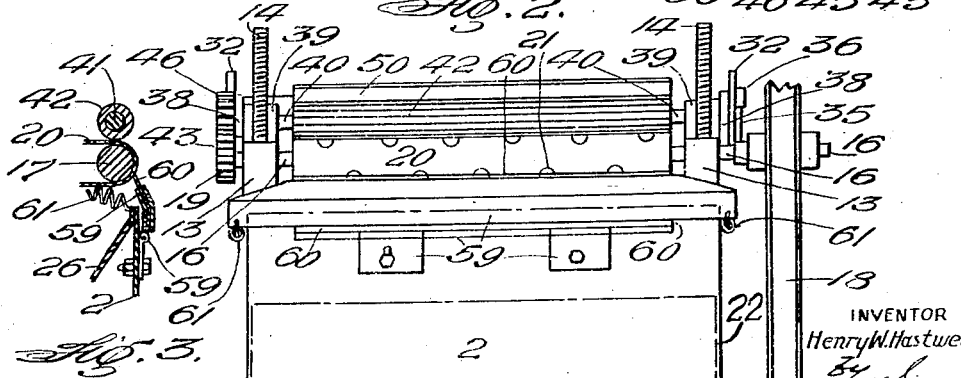
Figure 3 is a sectional detail view of a belt cleaner.
Figure 4 is an end elevation of the apparatus seen in Figures 1 and 2. The cover has been removed.

The invention includes a box 2 having at the feed end thereof two opposite upright flanges 3. Passing through the adjacent end of the box at each side thereof and extending to the adjoining flange 3 is a longitudinal adjusting screw 4 having an adjusting nut 5 bearing against the box end. Mounted upon each screw 4 is a travelling bearing nut 6 having a gullet indicated at 7. Located or bearing in the gullets 7 and extending between the nuts 6 is the spindle 8 of a first belt roller 9.

Within the box 2 adjacent to the roller 9 is a belt supporting plate 10 having formed in each of its ends a slot indicated at 11. The slots 11 accommodate the flanges 3. The ends of the plate 10 upstand above the belt, hereinafter described, and rest upon the sides of the box as indicated at 12.

Carried by the box 2 at each side of the delivery end thereof is a bearing block 13. Upstanding from each bearing block 13 is a threaded stud 14. Accommodated in each block 13 is a sleeve 15. Extending between and accommodated in the sleeves 15 is a spindle 16 of a second belt roller 17. Mounted upon one end of the spindle 16 is a pulley 18 driven by a belt from a suitable electric motor or the like. Or, in some instances, for small quantities of peas, the pulley could be rotated by hand. Mounted upon the other end of the spindle 16 is a first pinion 19.

Passing round the first and second rollers 9 and 17 is a belt 20 of canvas and rubber or any other suitable material. Formed in the belt 20 is a series of perforations or holes indicated at 21.

Figure 14:
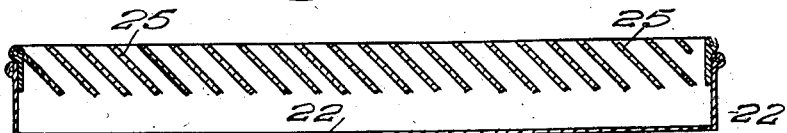
Figure 14 is a side sectional elevation of a modified pea receiving drawer.

Located in the bottom of the box 2 is a sliding pea receiving drawer 22 having therein (Figure 1) a removable frame 23 covered with wire netting or the like 24 to form a grid. Or the grid may consist of a series of inclined lateral plates 25, as indicated in Figure 14.

Carried by and extending between the delivery end of the box and the adjacent end of the drawer 22, below the second belt roller 17, is a baffle deflecting plate 26.

Located within the box at each side thereof, adjacent to each first side flange 3, is a second side flange 27. Extending between the flanges 27 and located between the upper and lower portions of the belt 20 is a floating pea stop or deflector 28 having end grooves, indicated at 29, to accommodate the flanges 27. Carried by the deflector are upper and lower rubber flanges or ribs 30. The deflector rests lightly upon the lower portion of the belt and prevents peas which pass through the upper section of the belt from travelling with the belt to the first roller 9.

Outstanding from each side of the box 2, adjacent to the delivery end thereof, is a pivot pin 31. Pivoted to each pin 31 is the lower end of an upstanding arm 32 having therein a slotway indicated at 33. Outstanding from the lower end of each arm 32 is a flange or shoulder 34. Passing through the flange 34 is the lower end of a threaded adjusting rod 35 retained by nuts bearing against the flange 34. Carried by the upper end of each rod 35 is a ring or head 36. Passing through the ring or head 36 of each rod 35 is a pivot pin or stud 37 outstanding from and carried by the inner end of a longitudinal arm 38. Carried by the outer end of each arm 38 is a bearing 39. The bearings 39 rest upon the sleeves 15 of the spindle 16 of the second roller 17.

Mounted in and extending between the bearings 39 of the arms 30 is the spindle 40 of a squeezing roller 41 having a longitudinally fluted rubber covering or sleeve 42. Mounted upon one end of the spindle 40 is a second pinion 43 adapted to engage the first pinion 19. Mounted upon a stud or spindle 44 carried by the arm 38 which adjoins the pinion 43 is a third pinion 45 adapted to engage the said pinion 43. Engaging the pinion 43 is a fourth pinion 46 mounted upon one end of the spindle 47 of a feed device 48. The feed device preferably consists of four sectors 49 bolted together as indicated in Figure 5 and adapted to clamp between them rubber vanes 50.

Resting upon the bearing 39 of each arm 38 is a bearing block 51 having a hole therein to pass the adjoining stud 14.

Resting upon the top of the box 2 is a cover comprising a storage tray 52 at the front or feed end of which is a grid formed by a series of longitudinal ribs 53. At the rear or delivery end of the cover is a crown 54 beneath which the feed device 48 is located. Projecting rearwardly of the crown 54 is a flange 55 having therein two free stud holes 56 to pass the studs 14. Encircling each stud is a coiled spring 57 located beneath a finger nut 58.

Carried by the back of the box 2 is a belt cleaner comprising a pair of lateral members 59 between which is clamped a rubber strip 60. The strip 60 bears against the belt 20 as it passes round the second roller 17 and is retained in contact with the belt by a spring 61 secured to each end of one of the members 59 and to the box 2.

Instead of using the storage tray 52 and grid the feed device 48 may be mounted in a hopper 62 although driven by the toothed pinions already described. The hopper 62 may be mounted upon a pivot pin 63, if desired, extending between two side standards or the like, not shown, so that the relationship to the belt 20 below it may be adjusted. Within the hopper, at one side thereof, is a ribbed or fluted rubber lining 64. The bottom of the hopper, below the feed device 48, is provided with a discharge opening 65. Located upon the top of the box, adjacent to the hopper, is a pea storage tray 66.

In lieu of the hopper 62 a hopper 67 may be used having a discharge opening 68 communicating with an upper casing 69 and provided with a regulating shutter 70 controlled by an adjusting screw 71. Mounted in the upper casing 69 is an upper feed device 48 having additional fixed vanes 72. The upper casing 69 is provided at one side with ribbed or fluted rubber lining 73 and a discharge opening 74. The opening 74 communicates with a lower casing 75 having at one side thereof a ribbed or fluted rubber lining 76. The linings 73 and 76 are oppositely located. Mounted in the lower casing is a lower feed device 48 driven by toothed pinions as already described. The upper feed device is driven by a spur wheel mounted upon the spindle of the said device. The spur wheel engages the toothed pinion of the lower feed device. The upper and lower feed devices thereby rotate in opposite directions, the upper one at a slow speed and the lower one at a higher speed.

In the embodiment of the invention shown in Figures 1 to 11 the peas to be shelled are placed in the tray 52 and fed by hand to the grid where they are aligned longitudinally by the ribs 53 and fall upon the belt 20 beneath them. By means of the pulley 18 and pinions 19, 43, 45 and 46 the rollers 17 and 41 and the feed device 48 are rotated causing the belt to convey the peas to the device 48 where the vanes 50 force the pods beneath the rubber covered roller 41. As the pods pass beneath the roller 41 the peas in the pods are forced together or along the pods and burst them open. The freed peas are projected back upon the belt 20 and pass through the holes 21 therein to the drawer 22. The belt is cleaned or scraped as it passes round the roller 17, by the rubber strip 60. Any desired number of cleaning devices may be used and be located where convenient. Drip gutters or drains, also, may be obviously embodied in the cleaning devices. Similarly, any number of feed devices may be employed. A feed device, for example, may be used near the feed end of the apparatus to initially treat or partially burst or fracture the pods. The empty pods fall into a suitable receptacle, not shown, provided below the roller 17 at the back or delivery end of the box. The box may be clamped to a stand or table or the like but preferably a suitable tubular or like framework or stand is provided as a permanent fixture to the box and provision is made in such stand to accommodate an electric motor or the like to drive the pulley 18. It will be obvious that by adjusting the nuts 58 and rods 35 the pressure exerted by the roller 41 and feed device 48 may be varied. Also, by means of the screws 4 and nuts 5 and 6 the tension of the belt may be adjusted and any stretch taken up. By removing the nuts 58 and springs 57 the cover 52, 53, 54, 55 may be lifted bodily from the box 2. The arms 38 and with them the roller 41 and feed device 48 may then be lifted bodily and swung longitudinally backwardly along the top of the box, pivoting upon the pins 31, 37. The belt cleaner 59, 60 also may be down-swung or over-turned against the influence of the springs 61. The machine is now exposed for easy cleaning.

Figure 12:
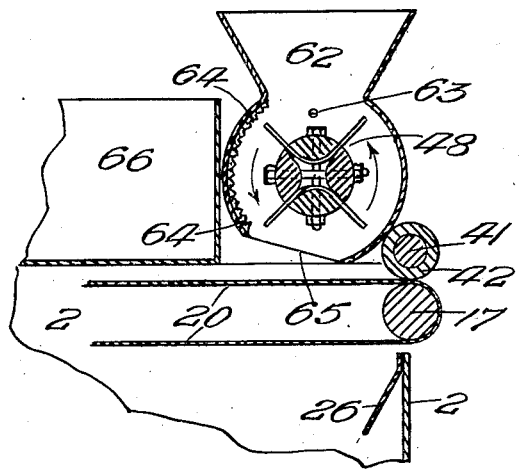
Figure 12 is an enlarged sectional detail view of a feed hopper containing a feed device.
Figure 13:
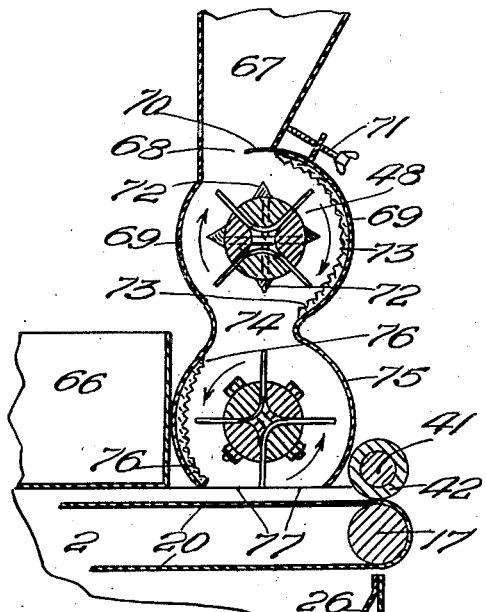
Figure 13 is an enlarged sectional detail view of a feed hopper containing a plurality of feed devices.

In the embodiment shown in Figure 12 the peas to be podded are stored in the tray 66 and fed by hand into the hopper 62. The feed device 48 is rotated by toothed gearing as previously described. The unshelled peas are driven by the vanes 50 of the device 48 against the rubber lining 64 and burst open and discharge the peas upon the belt 20. The peas pass through the holes in the belt. The empty pods are fed onward by the belt and pass beneath the roller 41. The belt and rollers, therefore, function to separate the peas (ejected in the hopper) from the empty pods, but should any pods still contain peas when the rollers are reached, the latter will eject the peas from the pods by the squeezing action. The hopper may be swung upon its pivot 63 to adjust its relationship with the belt 20, if desired, and it may be formed in halves bolted together to ensure easy dismantling and assembling, but it will be found advantageous to increase the number of vanes carried by the feed device 48 up to double the number shown in the drawings. The hopper feed is quite efficient.

In the embodiment shown in Figure 15 it will be seen that unshelled peas are first driven by the upper feed device 48 against the lining 73. They are discharged to the oppositely rotating lower feed device and are driven against the lining 76. The smaller vanes 72 of the upper device assist in breaking open the pods and in discharging them. The lower device is driven by the toothed pinions already described. The upper device 48 is rotated by a spur wheel engaging the pinion 46 of the lower feed device. The upper feed device preferably rotates at a reduced speed. The pods are opened completely by the two feed devices. The peas are discharged upon the belt 20 and pass through its holes 21 whilst the empty pods pass beneath the squeezing roller 41.

I claim:

1. A pea shelling apparatus comprising a pair of superimposed pod squeezing rollers, a belt having a series of pea delivery holes therein and passing around the lower roller, a floating pea stop or deflector located between the upper and lower portions of the belt, a pea-receiving receptacle located below the belt, and a feed device having a plurality of vanes located above the holed belt adjacent to the squeezing rollers and serving to force the pods between the upper roller and the belt as such belt passes around the lower roller.

2. A pea shelling apparatus including a pair of superimposed squeezing rollers, a belt having a series of pea delivering holes therein and passing around the lower roller, a pea receiving receptacle located below the belt, a hopper located above the holed belt adjacent to the rollers, a rotary feed device having a plurality of vanes mounted in the hopper to force pods to be shelled against the sides of the hopper during the delivery from the hopper to the belt, said vanes also serving to force the pods delivered to the belt between the upper roller and the belt as it passes over the lower roller.

3. A pea shelling apparatus comprising a pair of superimposed squeezing rollers, a belt having a series of pea delivery holes therein and passing around the lower roller, a floating pea deflector between the upper and lower portions of the belt, a pea receiving receptacle located below the holed belt, an open bottomed hopper having opposite outwardly curved sides located above the holed belt and adjacent to the rollers, a series of lateral serrations carried by one of the curved sides within the hopper, a rotary feed device having a plurality of vanes mounted in the hopper between the curved sides and above the open bottom to force the pods fed into the hopper against the said serrations during the passage of the said pods through the hopper to the holed belt, said vanes serving also to force the pods delivered to the belt between the upper squeezing roller and the said belt as it passes around the lower roller, and means for adjusting the pressure exerted by the feed device upon the pods delivered to the belt.

4. A pea shelling apparatus comprising a pair of superimposed squeezing rollers, a belt having a series of pea delivery holes therein and passing around the lower roller, a hopper having an upper and a lower casing located above the holed bolt and adjacent to the rollers, a rotary feed device having a plurality of vanes mounted in each casing, the feed device in the upper casing serving to force pods to be shelled against its sides in the delivery of the pods to the lower casing, and the feed devices in the lower casing serving to force pods to be shelled against its sides in the delivery of the pods to the holed belt, said later feed device also serving to force the pods delivered to the belt between the upper roller and the said belt as it passes over the lower roller.

5. A pea shelling apparatus comprising a pair of superimposed squeezing rollers, a belt having a series of pea delivery holes therein and passing around the lower roller, a floating pea stop located between the upper and lower portions of the belt, a pea receiving receptacle located below the holed belt, a hopper having an upper and a lower casing located above the belt adjacent to the rollers, each casing having outwardly curved sides and a series of internal serrations carried by one of the sides within each casing, a rotary feed device having a plurality of vanes mounted in each casing between the curved sides thereof, the feed device in the upper casing serving to force pods to be shelled against the serrations of that casing as the pods are delivered to the lower casing, and the feed device in the lower casing serving to force pods to be shelled against the serrations of that casing as the pods are delivered to the holed belt, the feed device in the lower casing also serving to force the pods delivered to the belt between the upper roller and the said belt as the belt passes over the lower roller.

6. A pea shelling apparatus, comprising a pair of superimposed pod squeezing rollers and an idle roller, a belt having a series of pea delivery holes therein, said belt passing around the idle roller and the lower roller of the squeezing pair, a floating pea stop located between the upper and lower portions of the belt and between the lower roller and the idle roller, a pea receiving receptacle below the belt, and a feed device having a plurality of vanes above the holed belt adjacent to the squeezing rollers and acting to force the pods between the upper roller and the belt as it passes round the lower roller, the peas being delivered to the receiving receptacle first through the holes in the upper portion and then through the holes in the lower portion of that part of the belt which is situated between the lower roller and the stop.

7. A pea shelling apparatus, comprising a pair of superimposed squeezing rollers and an idle roller, a belt having a series of pea delivery holes therein, said belt passing around the idle roller and the lower roller of the squeezing pair, a pea deflector between the upper and lower portions of the holed belt between the lower roller and the idle roller, a pea receiving receptacle below the holed belt, an open bottomed hopper above the belt adjacent to the pair of squeezing rollers at a position between them and the deflector, said hopper having a serrated internal surface, a dual purpose rotary feed device having a plurality of vanes mounted in the hopper above the open bottom thereof and forcing and rupturing against the serrations pods fed into said hopper, whereby the peas expelled from their pods in the hopper fall first through the holes in the upper portion and then through the holes in the lower portion of the belt at that position in the length thereof which is situated between the deflector and the lower roller, said vanes forcing the pods delivered to the belt between the upper roller and the said belt to expel any remaining peas back upon the belt for delivery through the holes therein, the empty pods being delivered from the belt as it passes around the lower roller.

8. A pea shelling apparatus, comprising a hopper having a feed opening at its top and a discharge opening at its bottom, a serrated rubbing surface within the hopper at one side thereof between the top and bottom, a vaned rotary device mounted in the hopper between the top and bottom thereof and adjacent to the serrated surface, a pair of superimposed squeezing rollers adjoining the discharge opening of the hopper, and an apertured belt beneath the hopper and passing around the lower one of the rollers and serving to force the pods delivered from the hopper between the upper roller and the belt, the holes in the belt being sufficiently large to pass the peas expelled in and received from the hopper while preventing passage of the pods.

9. A pea shelling apparatus, comprising a hopper having outwardly curved sides and an open top and an open bottom, a convex serrated rubbing surface carried within the hopper by one side thereof between the open top and bottom, a rotary feed device having flexible vanes mounted in the hopper between the open top and bottom thereof adjacent to the serrated surface, a pair of superimposed squeezing rollers adjoining the open bottom of the hopper, and an apertured belt passing around the lower one of the rollers and receiving both expelled peas and pods from the hopper, said belt's holes being sufficiently large to pass the expelled peas while preventing passing of the pods, said belt serving to force the pods between the upper roller and the belt.

H. W. HASTWELL.